Sept. 4, 1951   A. P. CROTTS   2,566,874
SAFETY LOCK FOR VEHICLE BRAKE CYLINDERS
Filed Dec. 7, 1948
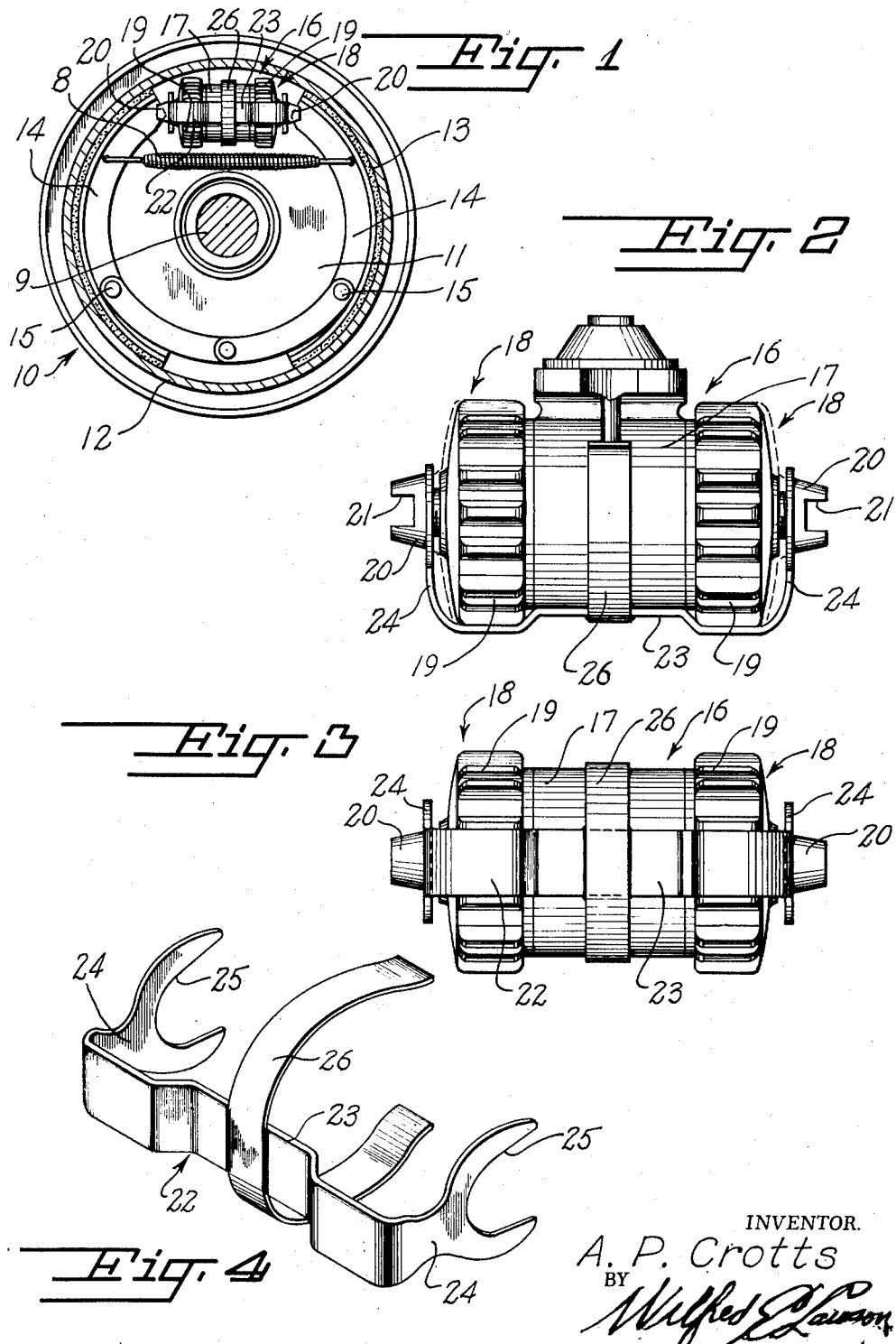
INVENTOR.
A. P. Crotts
BY
Attorney Patented Sept. 4, 1951

2,566,874

UNITED STATES PATENT OFFICE 2,566,874

SAFETY LOCK FOR VEHICLE BRAKE CYLINDERS

Andrew P. Crotts, Marlow, Okla.

Application December 7, 1948, Serial No. 63,991

2 Claims. (Cl. 188—152)

This invention relates to brakes, and more particularly to a safety lock for a fluid motor.

In certain vehicles, there is provided a fluid-actuated motor which is arranged adjacent each wheel. The motors are part of the brake assembly of the vehicle and are actuated by the pressure of hydraulic fluid. Each of these motors is provided with end caps which seat on the end of a cylinder and the caps have peripheral flanges closely encircling the ends of the cylinder. Each cap carries a bifurcated shank for engagement with the brake shoes to actuate the latter as the fluid pressure in the cylinder is changed.

It has been found that if one of the vehicle wheels runs off the axle while the vehicle is in motion, the end caps of the cylinder will immediately come off and the brake fluid will run out resulting in a failure of the brakes on all of the wheels, which frequently proves disastrous.

It is, therefore, an object of the invention to provide a safety lock for a brake motor which will prevent the end caps from coming off of the cylinder in the event the vehicle wheel runs off the axle while the vehicle is in motion.

Another object of the invention is to provide a safety lock for a brake motor which will not interfere with the normal operation of the brake motor.

A further object of the invention is to provide a brake motor safety lock which is extremely simple and inexpensive to manufacture.

Other objects and advantages will be apparent during the course of the following description.

In the accompanying drawings forming a part of this application, and in which like numerals are employed to designate like parts throughout the same;

Figure 1 is a section through the brake, with the safety lock applied to the brake cylinder, according to the present invention;

Figure 2 is an enlarged side elevational view of the safety lock applied to the brake cylinder;

Figure 3 is a plan view of the safety lock applied to the brake cylinder;

Figure 4 is an enlarged perspective view of the safety lock.

Referring to the drawings in detail, the numeral 10 designates a conventional wheel mounted on an axle 9 and including a backing plate 11, coil spring 8, drum 12, lining 13, and brake shoes 14, which are adapted to be actuated to stop the movement of the vehicle. The brake shoes 14 are pivotally supported on the pins 15 and for pivoting or actuating the shoes 14, there is provided a conventional fluid motor 16. The fluid motor 16 comprises a cylinder 17 having the usual brake fluid inlet port, and seated on each end of the cylinder 17 is a cap 18. Each cap 18 is provided with a peripheral flange 19 which snugly embraces the ends of the cylinder. Carried by each of end caps 18 is a shank 20 which has its end bifurcated, as at 21, for engagement with opposed portions of the brake shoes 14 to actuate the latter as the fluid pressure in the cylinder 17 is increased.

The present invention is directed to a safety lock for preventing the end caps 18 from coming off the cylinder 17 in the event the wheel 10 runs off the axle 9 while the vehicle is in motion. The safety lock is preferably fabricated of rigid metal and comprises an elongated strap 22 having its intermediate portion offset, as at 23, so that the strap will conform in shape to the cylinder 17 and caps 18. The ends of the strap 22 are bent to define transversely-disposed flanges 24, and each flange 24 is slotted, as at 25, for slidably receiving therein the bifurcated shank 20. The lock is constructed so that when it is applied to the fluid motor there will be a slight clearance between the flanges 24 and the caps 18 so that the normal movement of the caps 18 will not be interfered with.

For retaining the safety lock on the fluid motor, there is provided an open-mouthed spring clip 26 which is secured to the strap 22 by welding. The spring clip 26 grips the cylinder 17 and prevents the safety lock from being accidentally dislodged from the cylinder.

From the foregoing, it is apparent that a safety lock has been provided which will prevent the end caps 18 from accidentally coming off the cylinder. This will ensure that the vehicle brake system will continue to function in the event the vehicle wheel runs off, since there will be no loss of brake fluid out of the cylinder 17.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a brake for a vehicle wheel, the combination with a brake shoe, and a fluid motor for actuating said shoe, said fluid motor comprising a cylinder, a cap seated on each end of said cylinder, a shoe-engaging shank carried by each of said caps, of a safety lock for preventing accidental removal of said caps from said cylinder when the brake shoe is free to move beyond its normal extent of operative movement, said lock embodying a strap arranged longitudinally of said cylinder, a spring clip secured to said strap for fastening said strap to said cylinder, and a transversely-disposed flange projecting from each end of said strap, there being a slot arranged in each of said flanges for slidably receiving said shank.

2. In a safety lock for a fluid motor, an elongated strap provided with an intermediate offset portion, a transversely-disposed flange projecting from each end of said strap, each of said flanges being provided with a slot, and means embodying a spring clip extending from the same side of the strap as the flanges for fastening said strap to a brake cylinder.

ANDREW P. CROTTS.

REFERENCES CITED

The following references are of record in the file of this patent:

UNITED STATES PATENTS

| Number | Name | Date |
|---|---|---|
| 234,323 | Noyes | Nov. 9, 1880 |
| 1,618,194 | Herrmann | Feb. 22, 1927 |
| 1,850,663 | Dacus | Mar. 22, 1932 |
| 2,175,433 | Geyer | Oct. 10, 1939 |
| 2,298,981 | Smith | Oct. 13, 1942 |
| 2,313,431 | Goepfrich | Mar. 9, 1943 |
| 2,414,986 | Tinnerman | Jan. 28, 1947 |